(12) United States Patent
Wang

(10) Patent No.: US 7,734,632 B2
(45) Date of Patent: Jun. 8, 2010

(54) SYSTEM AND METHOD FOR TARGETED AD DELIVERY

(75) Inventor: Yiqing Wang, Bothel, WA (US)

(73) Assignee: Disney Enterprises, Inc., Burbank, CA (US)

(*) Notice: Subject to any disclaimer, the term of this patent is extended or adjusted under 35 U.S.C. 154(b) by 22 days.

(21) Appl. No.: 11/262,240

(22) Filed: Oct. 28, 2005

(65) Prior Publication Data

US 2007/0100796 A1 May 3, 2007

(51) Int. Cl.
*G06F 7/00* (2006.01)
(52) U.S. Cl. ...................... 707/749; 707/750
(58) Field of Classification Search .............. 707/3; 715/745
See application file for complete search history.

(56) References Cited

U.S. PATENT DOCUMENTS

| | | |
|---|---|---|
| 5,636,346 A | 6/1997 | Saxe |
| 5,727,129 A | 3/1998 | Barrett et al. |
| 5,848,396 A | 12/1998 | Gerace |
| 5,933,827 A | 8/1999 | Cole et al. |
| 5,943,670 A | 8/1999 | Prager |
| 6,009,410 A | 12/1999 | LeMole et al. |
| 6,014,638 A | 1/2000 | Burge et al. |
| 6,029,176 A | 2/2000 | Cannon |
| 6,029,195 A | 2/2000 | Herz |
| 6,038,560 A | 3/2000 | Wical |
| 6,038,561 A | 3/2000 | Snyder et al. |
| 6,055,510 A | 4/2000 | Henrick et al. |
| 6,066,542 A | 5/2000 | Reznik et al. |
| 6,108,645 A | 8/2000 | Eichstaedt et al. |
| 6,154,783 A | 11/2000 | Gilmour et al. |
| 6,202,058 B1 | 3/2001 | Rose et al. |
| 6,236,990 B1 | 5/2001 | Geller et al. |
| 6,266,668 B1 | 7/2001 | Vanderveldt et al. |
| 6,286,005 B1 | 9/2001 | Cannon |
| 6,314,426 B1 * | 11/2001 | Martin et al. ............... 707/100 |
| 6,327,574 B1 | 12/2001 | Kramer et al. |

(Continued)

OTHER PUBLICATIONS

Dwi H. Widyantoro, Thomas R. Ioerger, John Yen, An adaptive algorithm for learning changes in user interests, Proceedings of the eighth international conference on Information and knowledge management, p. 405-412, Nov. 2-6, 1999, Kansas City, Missouri, United States [doi>10.1145/319950.323230].*

(Continued)

*Primary Examiner*—Cam Y T Truong
(74) *Attorney, Agent, or Firm*—Ference & Associates LLC

(57) ABSTRACT

A method and system of generating a user profile for advertisement over a computer network is disclosed. A webpage identifier that identifies a webpage and a content category identifier that identifies a content category is generated. The webpage identifier is associated with the content category identifier if web content depicted in the webpage is relevant to the content category. A web server then receives a request for the webpage including the webpage identifier and a first user identifier from a client computer connected to the computer network. A user profile is located by determining whether the first user identifier matches a second user identifier corresponding to the user profile. The user profile includes at least one user content category identifier and a corresponding user interest score. The corresponding user interest score is increased by the predetermined amount if the content category identifier matches the user content category identifier.

31 Claims, 7 Drawing Sheets

430

| Content Category ID | Interest Score | Tiemestamp webpage request | Decay Rate Applied | |
|---|---|---|---|---|
| Golf | 25 | 03/06/2005 4:40 PM | Short Term | 442 |
| Formula One Car Racing | 15 | 08/21/2004 7:57 PM | Short Term | 444 |
| IndyCar Car Racing | 20 | 01/09/2005 2:03 PM | Short Term | 446 |

U.S. PATENT DOCUMENTS

| | | | |
|---|---|---|---|
| 6,385,619 | B1 | 5/2002 | Eichstaedt et al. |
| 6,389,469 | B1 | 5/2002 | Vekslar et al. |
| 6,415,322 | B1 * | 7/2002 | Jaye ........................... 709/224 |
| 6,421,675 | B1 * | 7/2002 | Ryan et al. .................. 707/100 |
| 6,438,579 | B1 | 8/2002 | Hosken |
| 6,446,261 | B1 | 9/2002 | Rosser |
| 6,460,036 | B1 | 10/2002 | Herz |
| 6,484,149 | B1 | 11/2002 | Jammes et al. |
| 6,484,164 | B1 | 11/2002 | Nikolovska et al. |
| 6,539,375 | B2 | 3/2003 | Kawasaki |
| 6,578,025 | B1 | 6/2003 | Pollack et al. |
| 6,606,619 | B2 | 8/2003 | Ortega et al. |
| 6,611,842 | B1 | 8/2003 | Brown |
| 6,681,247 | B1 | 1/2004 | Payton |
| 6,707,470 | B1 | 3/2004 | Sashihara |
| 6,721,744 | B1 | 4/2004 | Naimark et al. |
| 6,801,909 | B2 | 10/2004 | Delgado et al. |
| 6,839,680 | B1 | 1/2005 | Liu et al. |
| 6,853,982 | B2 | 2/2005 | Smith et al. |
| 6,882,977 | B1 | 4/2005 | Miller |
| 2002/0054089 | A1 | 5/2002 | Nicholas et al. |
| 2002/0082923 | A1 | 6/2002 | Merriman et al. |
| 2002/0111994 | A1 * | 8/2002 | Raghunandan .............. 709/203 |
| 2002/0116258 | A1 | 8/2002 | Stamatelatos et al. |
| 2003/0023481 | A1 | 1/2003 | Calvert et al. |
| 2003/0055831 | A1 | 3/2003 | Ryan et al. |
| 2003/0074400 | A1 | 4/2003 | Brooks et al. |
| 2003/0078928 | A1 | 4/2003 | Dorosario et al. |
| 2003/0088554 | A1 | 5/2003 | Ryan et al. |
| 2003/0128236 | A1 * | 7/2003 | Chen ........................... 345/745 |
| 2003/0208402 | A1 | 11/2003 | Bibelnieks et al. |
| 2004/0024719 | A1 | 2/2004 | Adar et al. |
| 2004/0024777 | A1 * | 2/2004 | Schaffer ................. 707/103 R |
| 2007/0061195 | A1 * | 3/2007 | Liu et al. ...................... 705/14 |

OTHER PUBLICATIONS

Kazunari Sugiyama, Kenji Hatano, Masatoshi Yoshikawa, Adaptive web search based on user profile constructed without any effort from users, Proceedings of the 13th international conference on World Wide Web, May 17-20, 2004, New York, NY, USA [doi>10.1145/988672.988764].*

A Min Tjoa; Max Höfferer; Güter Ehrentraut and Peter Untersmeyer, Applying Evolutionary Algorithms to the Problem of Information Filtering, Paper, 9 page(s).

Yiqing Wang, Observer Design in Systems with Discrete Event Output and Applications to Association Memory; An abstract submitted on Sep. 24, 2002 to the Department of Electrical Engineering & Computer Science of the Graduate School of Tulane University in Partial Fulfillment of the Requirements for the Degree of Doctor of Philosophy in Electrical Engineering, Submission date Sep. 24, 2002, 129 page(s).

Yiqing Wang, A Control Method for Human Memory A Dissertation Submitted on Dec. 23, 2001 Department of Electrical Engineering & Computer Science of the Graduate School of Tulane University in Partial Fulfillment of the Requirements for the Degree of Doctor of Philosophy in Electrical Engineering, Submission date Dec. 23, 2001, 72 page(s).

* cited by examiner

430

| Content Category ID | Interest Score | Tiemestamp webpage request | Decay Rate Applied | |
|---|---|---|---|---|
| Golf | 25 | 03/06/2005 4:40 PM | Short Term | 442 |
| Formula One Car Racing | 15 | 08/21/2004 7:57 PM | Short Term | 444 |
| IndyCar Car Racing | 20 | 01/09/2005 2:03 PM | Short Term | 446 |

| Content Category ID | Interest Score | Tiemestamp webpage request | Decay Rate Applied | |
|---|---|---|---|---|
| Golf | 43.125 | 07/15/2005 8:32 AM | Long Term | 442 |
| Formula One Car Racing | 15 | 08/21/2004 7:57 PM | Short Term | 444 |
| IndyCar Car Racing | 20 | 01/09/2005 2:03 PM | Short Term | 446 |

FIG. 4D

SYSTEM AND METHOD FOR TARGETED AD DELIVERY

BACKGROUND OF THE DISCLOSURE

1. Field of the Disclosure

The present disclosure relates to ad delivery methods and systems. In particular, it relates to delivering personalized ads to online users based on user behavior.

2. General Background

Internet advertising has become a prime direct marketing channel for companies selling goods and services. Furthermore, Internet advertising offers the unprecedented opportunity to tailor individualized ads to online users because online users generate behavioral and demographic data that provide insight into their goals and preferences. However, Internet advertising is moving well beyond targeting the user solely by demographic data or by the content of the page being viewed, and is currently being focused on consumers' online behavior. User behavior can be established by tracking user activities online, storing user preferences, etc. Internet advertising, however, is in need of more innovative and effective ways to generate user behavior patterns.

Behavior targeting goes beyond reach, frequency and monetary value of a user and can addresses the goal of online advertising which delivers a relevant ad to an interested user at the right time. Behavioral targeting looks at the past behavior of the users and targets advertisements accordingly. Behavioral targeting can be seen as a basic business practice that allows marketers to segment their audiences into manageable groups, deliver the right message to the right person at the right time, and better manage the relationship between marketers and their customers. Behavior targeting uses integrated data from user's online activities to create a comprehensive profile that can be targeted using delivery mechanisms.

Current systems of behavior targeting, however, typically record every user visit to a website, the visit time, and other information that has proven to be excessive because of the associated storage space required to record such information. In other current systems, a user that visits a website a certain threshold number of visits is automatically tagged as having one behavior so no further action is taken to reflect user behavior changes. As such, current systems have not yet exploited the full potential of behavior targeting on Internet advertising.

SUMMARY

In one aspect, there is a method of generating a user profile for advertisement over a computer network. A webpage identifier that identifies a webpage is generated. The webpage identifier can be a universal resource locator. A content category identifier that identifies a content category is generated. The webpage identifier is associated with the content category identifier if web content depicted in the webpage is relevant to the content category. A web server then receives a request for the webpage, the request including the webpage identifier and a first user identifier, the request being received from a client computer connected to the computer network. The webpage request can include a webpage request timestamp. A user profile is located by determining whether the first user identifier matches a second user identifier corresponding to the user profile. The user profile includes at least one user content category identifier and a corresponding user interest score. A predetermined amount is established independently from the web content depicted in the webpage being viewed by the user. The corresponding user interest score is increased by the predetermined amount if the content category identifier matches the at least one user content category identifier.

In a further aspect, the corresponding user interest score is indicative of a level of interest of the user in a content category identified by the at least one user content category identifier. The corresponding user interest score can also be reduced according to a decay rate. In addition, the corresponding user interest score is reduced daily regardless of whether a webpage request has been received at the web server. In another aspect, the corresponding user interest score is reduced periodically or from time-to-time regardless of whether a webpage request has been received at the web server.

In another aspect, the corresponding user interest score can be reduced according to a long-term decay rate which slowly reduces the corresponding user interest score. The corresponding user interest score can be reduced by a long-term decay rate if the corresponding user interest score surpasses a high threshold. In another aspect, the corresponding user interest score can also be reduced according to a short-term decay rate which rapidly reduces the corresponding user interest score. The corresponding user interest score is reduced by a short-term decay rate if the corresponding user interest score decreases below a low threshold.

In yet another aspect, the corresponding user interest score can be further reduced according to a short-term decay rate which rapidly reduces the corresponding user interest score, wherein if the corresponding user interest score surpasses a high threshold the corresponding user interest score ceases to be reduced by the short-term decay and instead is reduced by a long-term decay rate. A plurality of decay rates can be used to decay the corresponding user interest score, wherein a decay rate from the plurality of decay rates is chosen to be utilized depending upon the user behavior.

In another aspect, the corresponding user interest score of a first content category in the user profile can be decayed at a different rate from the corresponding user interest score of a second content category, wherein the difference is due to the user behaving differently with respect to the first content category in comparison to the second content category. The corresponding user interest score of the first content category in the user profile is decayed slowly if the user shows a long-term interest in the content category. The user can be deemed to show a long-term interest if the user makes webpages requests frequent enough such that the corresponding user interest score increases beyond a predefined threshold. The corresponding user interest score of the second content category in the user profile can be decayed quickly if the user shows a short-term interest in the content category.

In a further aspect, the corresponding user interest score can be assigned to be reduced by a long-term decay rate which if the corresponding user interest score of the content category identifier surpasses a high threshold. It is then determined whether the user has a long-term interest in the content category by checking whether the content category is assigned to be reduced by a long-term decay rate. If it is determined that the user has a long-term interest in the content category, the corresponding user interest score is decayed utilizing the long-term decay rate, wherein the long-term decay rate slowly reduces the corresponding user interest score. If it is determined that the user does not have a long-term interest in the content category, the corresponding user interest score is decayed utilizing the short-term decay rate. The user profile can be deleted if a webpage request is not received from a user after a threshold time. The user profile can be deleted if the corresponding user interest score decreases beyond a low threshold. The content category identifier and the corresponding user interest score can be deleted from the user profile if the corresponding user interest score decreases beyond a low threshold.

In another aspect, the corresponding user interest score can be further increased by taking into account an elapsed time between the time of a last webpage request and the time of the webpage request received. The corresponding user interest score can be increased in inversely proportion to the length of time of the elapsed time. The predetermined amount can be utilized to increase the corresponding user interest score every time the user makes a request to a website that has an associated content category. Alternatively, the predetermined amount can be utilized to increase all of the corresponding user interest score. The corresponding user interest score can be a numerical value in a range from zero to one hundred. The predetermined amount can be ten points.

In a further aspect, the webpage identifier, and the user identifier, in a log file are logged in a log file. The webpage identifier can be further associated with a second content category identifier that identifies a second content category, such that the when the webpage is requested, a second user interest score corresponding to the second content category identifier is increased by the predetermined amount. In another aspect, the user profile is implemented utilizing a data structure comprising a content category field, an interest score field, and a timestamp field. The user profile can be for example a database record, a map, or an instance of a class.

In one aspect, there is a system to deliver advertisement over a computer network, comprising a merchant server and a user profile database. The merchant server is can be configured to receive a webpage request from a web browser on the user computer, the webpage request including a universal resource locator and a user identifier. The user profile database can be configured to store user profiles, each user profile comprising a plurality of content category identifiers, wherein each of the plurality of content category identifier has a corresponding user interest score and a timestamp indicating when the webpage request is last received. The corresponding user interest score increases based on the frequency a webpage associated with the content category is requested.

In another aspect, the corresponding user interest score can be indicative of a level of interest of the user in a content category identified by the at least one user content category identifier. The user interest can also be reduced according to a decay rate. Further, the user interest score can be reduced daily regardless of whether a webpage request has been received at the web server. In another aspect, the user interest score can be reduced according to a long-term decay rate which slowly reduces the corresponding user interest score.

In a further aspect, the corresponding user interest score can be reduced by a long-term decay rate if the corresponding user interest score surpasses a high threshold. The corresponding user interest score can also be reduced according to a short-term decay rate which rapidly reduces the corresponding user interest score. In addition, the corresponding user interest score can be reduced by a short-term decay rate if the corresponding user interest score decreases below a low threshold.

In one aspect there is a method of receiving a targeted advertisement over a computer network. A client computer transmits a request for a webpage, the request including a webpage identifier and a first user identifier. The request being received by a web server that locates a user profile by determining whether the first user identifier matches a second user identifier corresponding to the user profile. The web server further locates a content category identifier in the user profile by determining whether web content depicted in the webpage is associated to the content identified by the content category identifier. The web server increases a corresponding user interest score by a predetermined amount that is independent from the web content depicted in the webpage. The requested webpage is then received from the web server at the client computer. The webpage received at the client computer can include Internet content wherein the Internet content is related to a content category in the user profile having an associated interest score higher than a predetermined amount. The Internet content can include advertisement, music, or video.

BRIEF DESCRIPTION OF THE DRAWINGS

By way of example, reference will now be made to the accompanying drawings.

FIG. 4C illustrates a user profile and associated short-term and long-term decay rates.

FIG. 4D illustrates a user profile and associated short-term and long-term decay rates.

DETAILED DESCRIPTION

The method and system described herein establishes the level of interest that a user has in a given content category and delivers ads or content based on such interest level. A user interest is defined as the user's preference in the content categories. Thus, the interest is the result of a human being's behavior pattern which drives the user back to collect information in the same content category. The interest can be quantified by a number to be used to compare and select among the users. Unlike other systems, in which all demographic and behavioral information is recorded, the current system simply stores a numerical value that represents the user interest.

As such, the overall profile of a user can be established by assigning an interest score for each content category. Each interest score varies depending on the frequency of the visits and the amount of time in between visits to any webpage within an content category.

Thus, ad serving platforms and content management systems can present ads or adjust content of the ad depending on the interest score of each visitor. Furthermore, the variability of the interest score permits merchants to use this system to efficiently take advantage of fleeting revenue opportunities.

In the system and method described below, a user profile includes multiple interest scores, each interest score representing user interest for a particular content category. Moreover, each interest score can be increased according to a high frequency of visits, or decreased depending on decay. A short-term decay or a long-term decay rate can be applied to the interest score depending on the user behavior after over a period of time.

Figure 1:
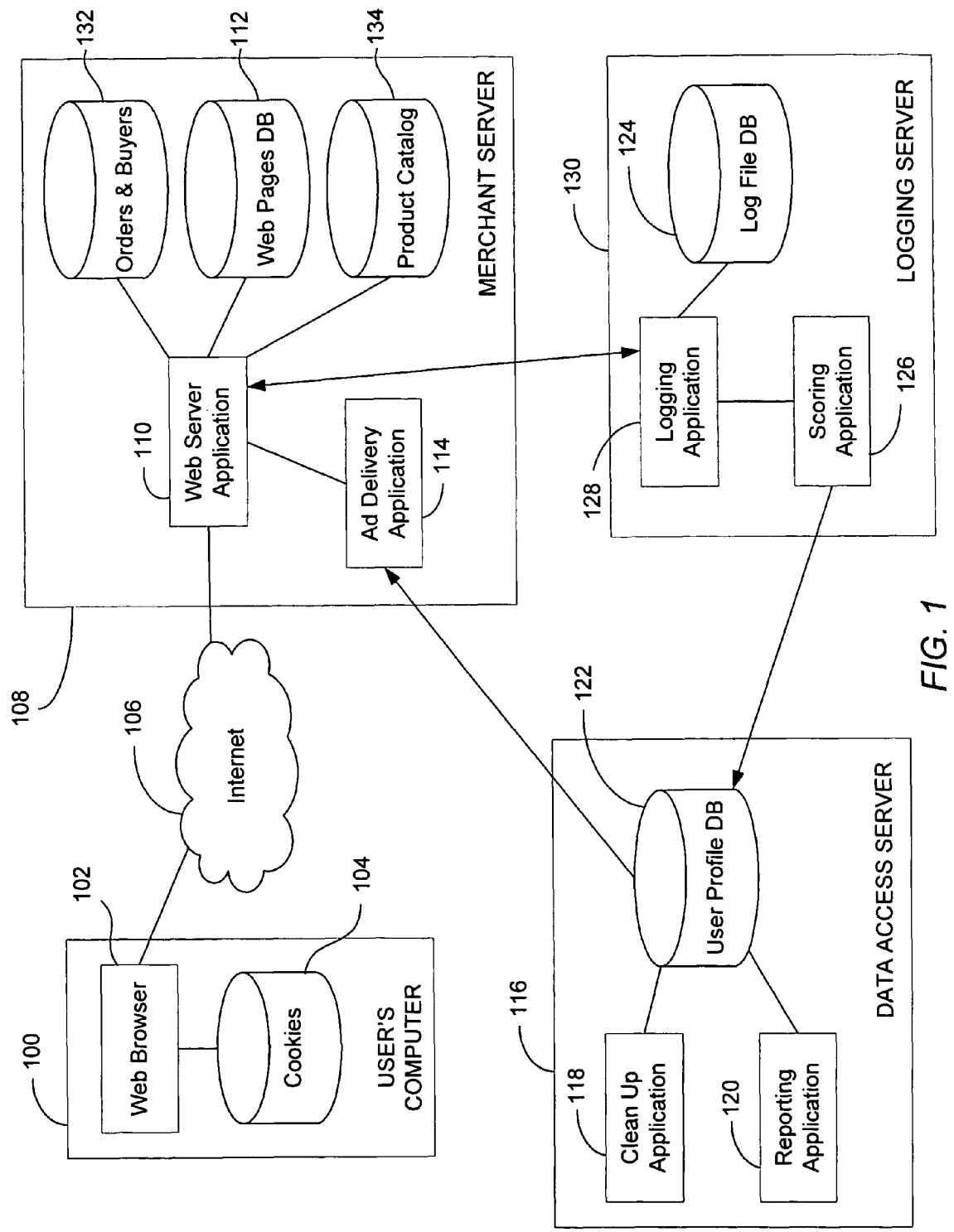
FIG. 1 illustrates a component diagram of an ad delivery system for an Internet website.

FIG. 1 illustrates a component diagram of an ad delivery system for an Internet website. A merchant server 108 provides information, sells merchant products, and advertises according to user behavior. The merchant server 108 includes a web server application 110 which retrieves a requested web page from the web pages database 112. The web server application also conducts online sales transactions such as providing a product catalog stored in a product catalog database 134 and storing buyers' information in an orders and buyers database 132. Furthermore, the web server application 110 interacts with an ad delivery application 114 which provides ad information to the web server application 110. In another embodiment, a content delivery application can also be used to interact with the web server application 110 and deliver targeted content to a user.

Once the web server application 110 receives a request through the Internet 106, the web pages sent back are routed to the user's computer 100. The user's computer 100 utilizes a web browser 102 to interface through the Internet 106 with the web server application 110. The web browser 102 has access to a cookies database 104 where cookies received from web server application 110 can be stored. The web browser 102 can also interact with the cookies database 104 to transmit the cookie message back to the web server application 110 when a web page associated with the cookie is requested.

A logging server 130 provides capabilities of logging and recording data regarding user webpage requests. The logging server 130 includes a logging application 128 that interacts with the web server application 110 in order to receive user webpage request information and store such information on a log files database 124. In one embodiment, the log files database 124 includes hash tables indexed by a user identifier.

In one embodiment, a scoring application 126 can be located at the logging server 130 and can utilize webpage request information received from logging application 128 in order to calculate interest scores. In one embodiment, the scoring application 128 utilizes algorithms that emulate the human memory function. Thus, the scoring application 128 can be configured with algorithms that calculate short-term interest scores and long-term interest scores. Short-term interest scores emulate short-term memory, while long-term interest score emulate long-term memory. Once the interest scores are calculated, the scoring application 126 populates interest score data on a user profile database 122 located on a data access server 116. The data access server 116 also includes a cleanup application 118 and a reporting application 120. The cleanup application 118 and the reporting application 120 can be configured as scheduled jobs within a scheduling framework. When running together, the cleanup application 118 should be scheduled prior to the reporting application 120. Both the cleanup application 118 and the reporting application 120 recursively read, process, and update all the user profiles.

In one embodiment, the data access server 116 and logging server 130 can be combined to be on one single server. The logging application 128, the scoring application 126, the clean up application 118, and the reporting application 120 can run in simultaneously on the single server, as well as the user profile database 122 and the log file database 124 being stored on the same server.

Figure 2:
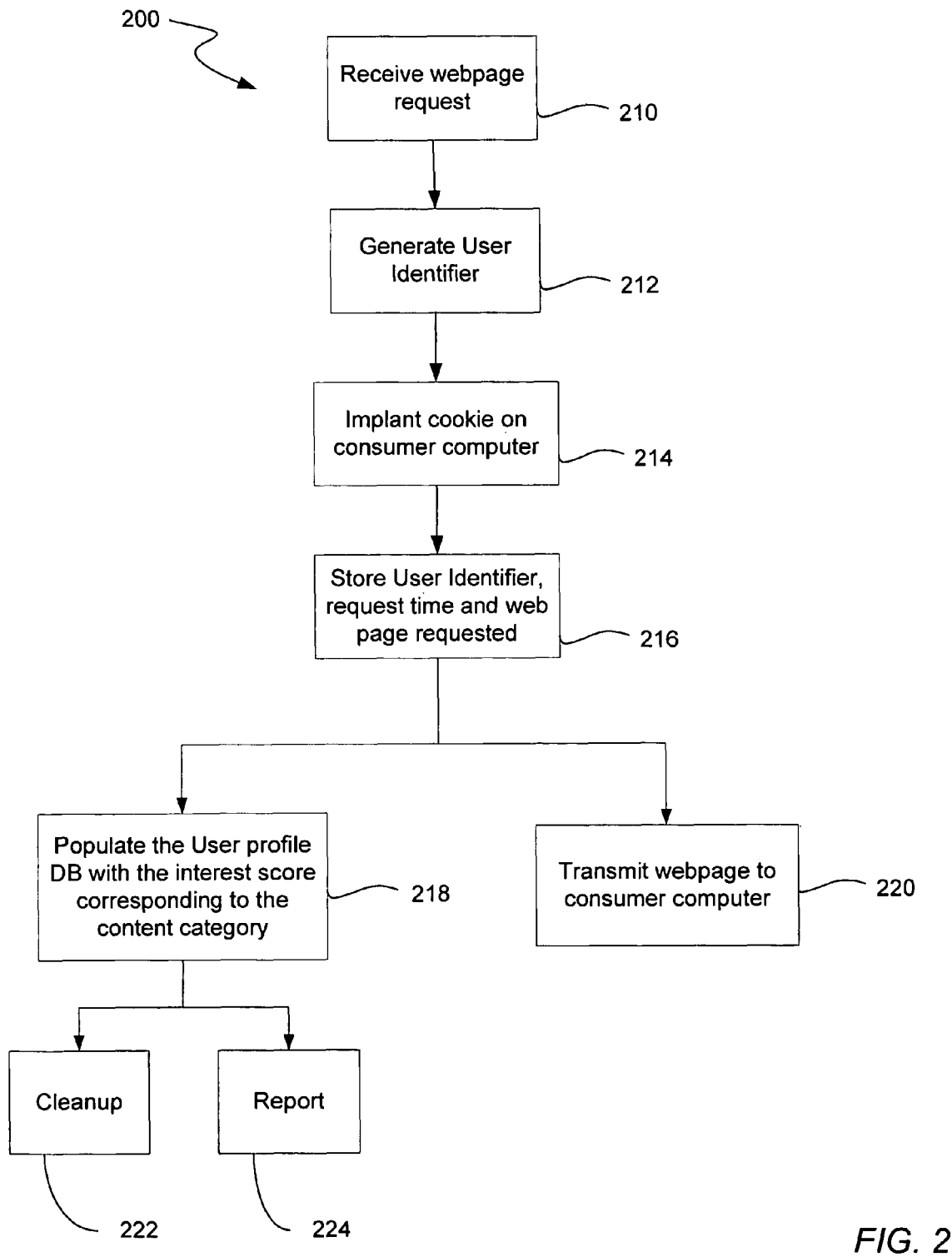
FIG. 2 illustrates a flow diagram of a process in which a user computer accesses the Internet website for the first time.

FIG. 2 illustrates a flow diagram of a process 200 in which a user computer accesses the Internet website for the first time. In process block 210, a webpage request is received from the user's computer 100. The web server application 110 receives a request through the Internet 106. In one embodiment, the web server application 110 can assume that the web browser 102 is accessing the website hosted by the merchant server 108 for the first time.

Next, in process block 212 a user identifier is generated by the web server application 110. If the web server application 110 determines that the web browser 102 is accessing the website for the first time, a user identifier is uniquely assigned to the user's computer 100. In one embodiment, the user identifier can be the internet protocol (IP) address of the user's computer 100.

In another embodiment, the user identifier is generated by the logging application 128. Because the logging application 128 can store the user identifiers in a log file in the log files database 124, the logging application 128 can generate a user identifier based on the previously assigned user identifiers.

In process block 214, a cookie is implanted on the user's computer 100. After generation of the user identifier, the web server application 110 packages the user identifier into a cookie and sends the cookie to the web browser 102. In subsequent times that the user accesses the website hosted by the web server application 110, the web browser can also send the user identifier which permits the ad delivery system to target personalized ads to the user.

In process block 216, the user identifier, the request time, and the universal resource locator requested are stored in the log files database 124. In one embodiment, the user identifier, the time at which the webpage was received by the web server 110, and the universal resource locator are hashed to a swapping hash table. The user identifier can be used as the key for the hash table.

In another embodiment, a new hash table can be created for each user and be stored as part of the log files database 124. The request time can be used as the key for the user hash table. Thus, the user's activities can be combined together and ordered by request time.

In process block 218, the scoring application 126 populates the user profile database 122 with the calculated interest score, content category, and request time. In one embodiment, the log files database 124 is periodically processed by the scoring application 126 to update the user profile database 122. The scoring application 126 can be configured to look up the user identifier in the user profile database 122 in order to locate the user profile and adjust the interest scores of the user.

As stated above, the scoring application 126 follows the model, and emulates the function of the human cerebellum, a brain subdivision whose main function is associative memory. Like the cerebellum, which makes strong neural associations for information that is constantly revisited, the scoring application 126 stores the user interest and increases the interest score according to an increase on the website visit frequency. The user interest score for each content category is increased according to the frequency of webpage requests. Thus, more webpage requests by a user in a certain amount of time, the higher the user interest for that particular content category. Moreover, like memory associations that are not constantly revisited in the brain, if the user does not visit a website frequently enough, the score continually decreases until the interest score reaches a low threshold level. If the interest score reaches the low threshold level, the corresponding user profile can be deleted, or at least the content category within the user profile can be removed.

In one embodiment, the scoring application 126 populates the user profile database 122 every time a new entry is made on the log file database 124. Thus, every time a user requests a webpage, the scoring application 126 updates the interest scores for that user. For each visit by each user, the scoring application 126 updates the user profile and sends the new profile data to the user profile database 122. In another embodiment, the scoring application 126 populates the user profile database 122 periodically or at any regular or irregular time interval.

In another embodiment, because the user's interest score for each content category is always decaying, the scoring application 126 updates the user profile database 122 to reduce all the interest scores in the user profile database 122. The scoring application 126 updates the interest scores depending on either a short-term interest formula or a long-term interest formula. Factors such as the frequency of webpage requests and time delay in between webpage requests can equally be applied by both the short-term interest formula and the long-term interest formula. However, the short-term interest formula can have a decay rate higher than the decay rate of the long-term interest formula. Thus, the long-term interest of a user on a particular content category can be reflected based on the decay rate.

In process block 222, the cleanup application 118 disposes of redundant or useless user profiles in the user profile database 122. In one embodiment, a user profile is considered no longer useful if the user profile has not been modified for a long period of time. If the user profile has not been modified for a long period of time, the cleanup application 118 can assume that the user has not visited the website for a long time. Through this mechanism, the cleanup application 118 ensures that user profiles with long-term interest decay rates are eliminated if the user profile has been stored for a period of time beyond a threshold level.

In another embodiment, a user profile is considered no longer useful if each interest score in the user profile is below a predefined threshold level. For example, where the interest score decays rapidly, the user profile may be eliminated unless the user visits the website very frequently. This mechanism can help the cleanup application 118 to ensure that the user profile database 122 keeps user profiles of users genuinely interested in short-term content.

In process block 224, the reporting application 120 queries the user profile database 122 and reports the user profile information. In one embodiment, the reporting application 120 queries the user profile database 122 and utilizes the extracted information to forecast inventory, adjust ad and content delivery strategy, or retrieve any information on the user profiles.

In process block 220, the webpage requested by the user is transmitted from the web server application 110 to the web browser 102. The web server application 110 then retrieves the necessary data from the webpages database 112 in order to transmit the requested webpage.

Figure 3:
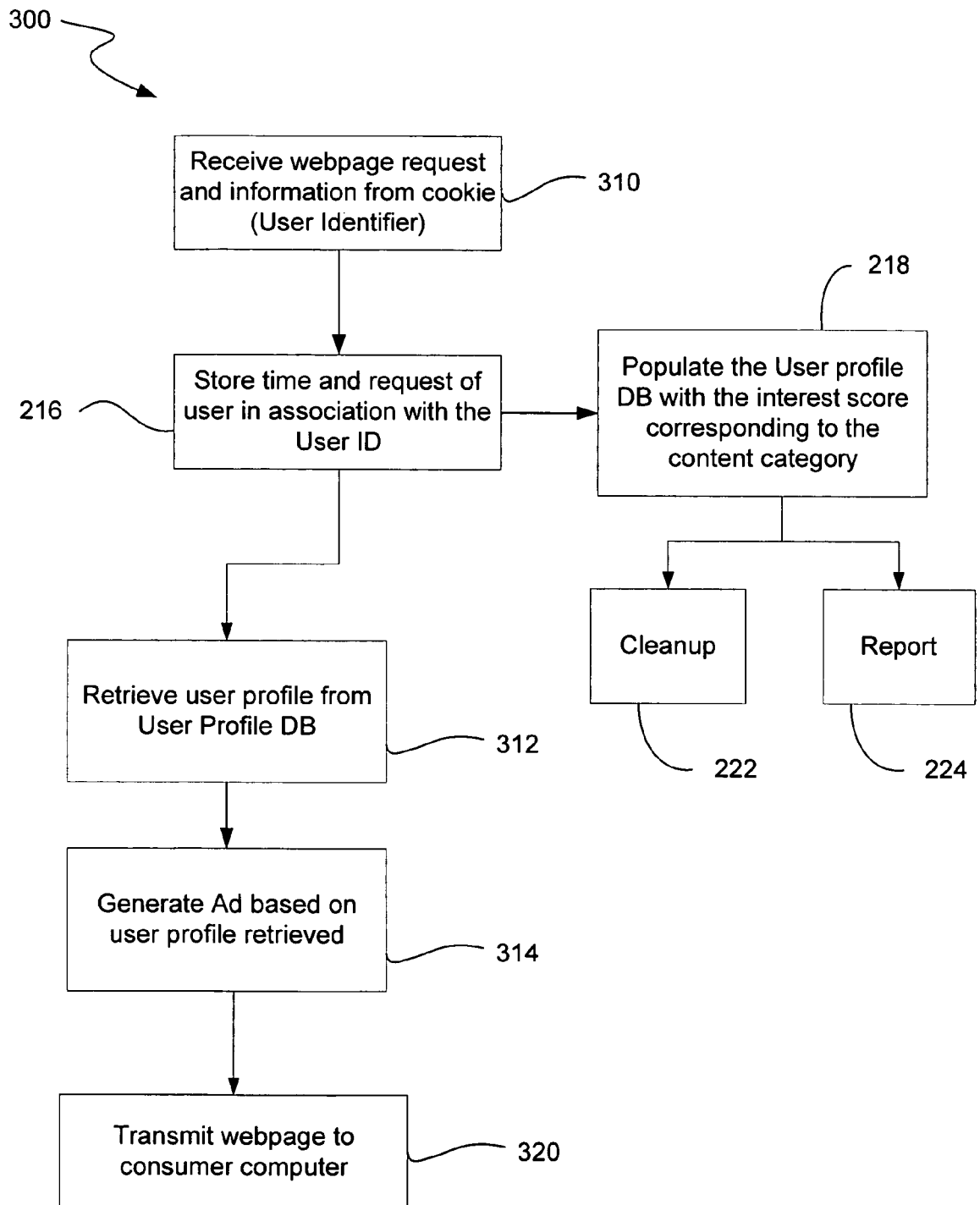
FIG. 3 illustrates a flow diagram of a process in which a user computer accesses the Internet website subsequent to the first time access.

FIG. 3 illustrates a flow diagram of a process 300 in which a user computer accesses the Internet website subsequent to the first time access. In process block 310, a webpage request and a cookie message are received from the user's computer 100. In one embodiment, because the webpage request occurs subsequent to a first webpage request, the user's computer already has an implanted cookie on the cookies database 104. When the user inputs the universal resource locator, the user's computer 100 automatically generates a webpage request with the message indicated by the cookie, namely the user identifier. When the web server application 110 receives the webpage request from the web browser 102, a cookie accompanies the webpage request which indicates to the web server application 110 that the user is a returning user.

Much like the first time a user requests the webpage, subsequent requests of the webpage triggers the above-mentioned of storing of webpage request information as shown in process block 216, populating the user profile database 218 as shown in process block 218, and performing cleanup and reporting operations as shown in process blocks 22 and 224, respectively. Therefore, as stated above, in process block 216 the user identifier, the request time, and the universal resource locator requested are stored in the log files database 124. In process block 218, the scoring application 126 can populate the user profile database 122 with a recalculated interest score. In addition, in process block 222 unused user profiles are eliminated, and in process block 224 user profiles can be outputted on a report format.

In process block 312, a user profile is retrieved from the user profile database 122 by the ad delivery application 114. In one embodiment, after the web server 110 receives the webpage request, the web server 110 sends the user identifier to the ad delivery application 114. The ad delivery application 114 utilizes the user identifier to query the user profile database 122 and obtain the user profile corresponding to the user requesting the webpage. With the user profile available, the ad delivery application 114 can generate an ad tailored to the interests of the user.

In process block 314, an ad is generated based on the user profile retrieved from the user profile database 122. In one embodiment, the ad delivery application 114 retrieves user profiles directly from the user profile database 122. In another embodiment, the user profile binary information can be decoded by a user segmentation application layer and later sent to the ad delivery application 114 in a format compatible with the ad delivery application 114.

As such, the segmentation application layer decodes the user profile and makes the user profile available to the ad delivery application 114. Furthermore, other applications located at the merchant server 130 can also retrieve user profiles efficiently without having to access and decode the user profile information from the user profile database 122.

In another embodiment, the user profile information is decoded dynamically. When the ad delivery application 114 receives a user identifier, the user identifier is used to query the segmentation application layer. If the user profile exists in the user profile database 122, the user profile can be decoded and modified to adjust the interest score that indicates the current interest level for each segment according to the current webpage request. A communication protocol between the ad delivery application 114 and the segmentation application layer is applied to transform the profile into a string of data that can be used directly by the ad delivery application 114 to apply the targeting logic.

Furthermore, the user profile database 122 can be updated immediately after receiving webpage request such that the user profile retrieved by the ad delivery application 114 includes the latest webpage request. For example, if the user requested a sports webpage, the webpage request information is reflected on the user profile, such that when ad delivery application 114 access the user profile, the user profile includes the webpage request for the sports webpage. Thus, the ad delivery application 114 can utilize interest scores that are updated with real-time data so the webpage requested includes behavioral ad targeting that takes into account the current webpage request.

In one embodiment, the ad delivery application 122 can be further utilized for inventory. An inventory management system can be utilized in tandem with the ad delivery application 122 in order to forecast inventory needs. The interest scores retrieved from the user profile database 122 and the advertisement presented to the users can be computed to calculate the demand for merchant products.

In another embodiment, the ad delivery application 122 can be used for targeted content delivery. Interest scores can further be used by the web server application 110 to tailor content displayed to the user. By providing personalized content, the user overall experience is enhanced thus increasing the probabilities that the user can continue requesting webpages from the merchant.

Finally, as stated above, in process block 320 the webpage requested by the user is transmitted from the web server application 110 to the web browser 102. However, because the ad delivery application 122 has generated an ad for the user, the web server application 110 can include the generated ad as part of the requested webpage.

Webpages with similar content can be classified under similar content categories. As mentioned earlier, human behavior is considered as a consistent process, and therefore online users consistently access the same or similar websites. Grouping similar webpages into content categories facilitates the segmentation of user behavior because a user can be assigned an interest score for each content category.

Content Categories

Figure 4A:
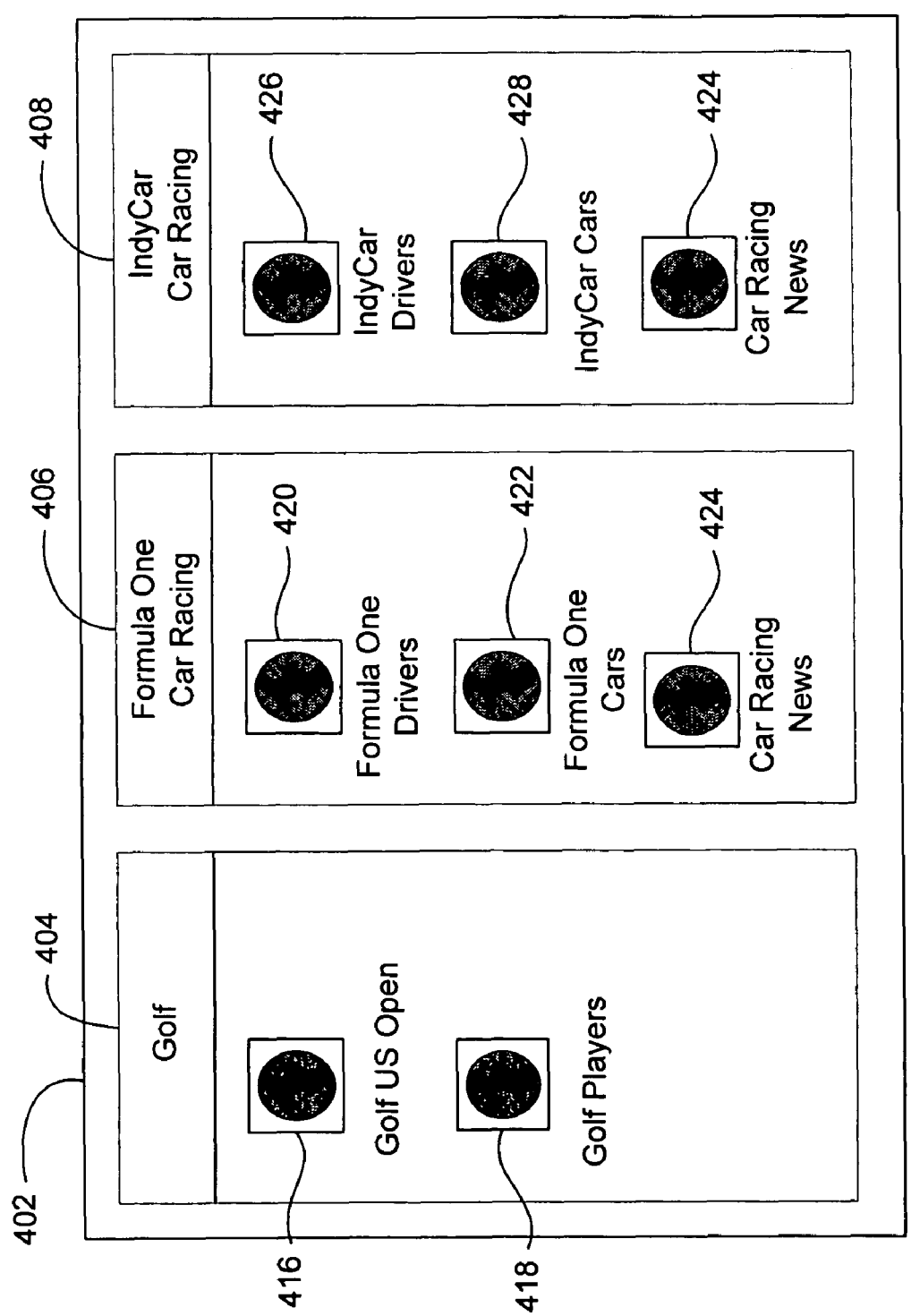
FIG. 4A illustrates content categories and web pages associated to the content categories.

FIG. 4A illustrates content categories and web pages associated to the content categories. Universal resource locators and corresponding content categories can be stored in a local database in the merchant server 108 or in the logging server 124. In one embodiment, the local database includes a relational table of content categories and universal resource locators associated with at least one content category.

Each content category can reflect a common area of interest. For example, a website 402 for the Entertainment and Sports Programming Network (ESPN) can have a content category 404 for Golf, a content category 406 for Formula One Car Racing, and a content category 408 for IndyCar Car Racing. One or more webpages can be associated with each content category.

For example, a webpage 416 related to the Golf US Open can be associated with the content category 404. When a user requests webpage 416, an identifier for webpage 416 is matched with the content category that had been previously associated with the webpage 416, namely content category 404. A user requesting a webpage 416 about the Golf US Open indicates a general level of interest in the content category 404 corresponding to Golf. Likewise, a webpage 418 related to the Golf Players can be matched with the content category 404. When a user requests webpage 418, the request can be associated with content category 404. A user that is interested in information on Golf Players can be assumed to be interested, at least partially, in Golf.

In another example, a user that is interested in Formula One Drivers, Formula One Cars, and Car Racing News can be assumed to be generally interested in Formula One Car Racing. Thus, a webpage 420 that includes content on Formula One Drivers can be associated with content category 406 for Formula One Car Racing. A webpage 422 related to the Formula One Cars can be associated with the content category 406. A webpage 424 related to Car Racing News can also be associated with Formula One Car Racing. Then, if a user requests webpage 424, the request is matched with content category 406 reflecting the user interest in Formula One Car Racing.

In yet another example, a content category 408 corresponding to IndyCar Car Racing can have one or more webpages associated with the content category 408. A webpage 426 that includes content on IndyCar Drivers, and a webpage 428 that includes content on IndyCar Cars can be associated with content category 406 for IndyCar Car Racing. In one embodiment, a user that visits the car racing news webpage 424 can also be deemed to be interested in IndyCar Car Racing. As such, a webpage can be associated with one or more content categories. Webpage 424, for example, can be associated with both Formula One Car Racing and IndyCar Car Racing. Thus, when a user requests the car racing new website 424, the user can be assumed to be interested in Formula One Car Racing and IndyCar Car Racing.

As previously explained, whenever a user requests a webpage, the user is assumed to have a certain level of interest in the associated content category. In order to profile the interest of the user in individual content categories a user profile is developed for each user.

User Profiling

Figure 4B:
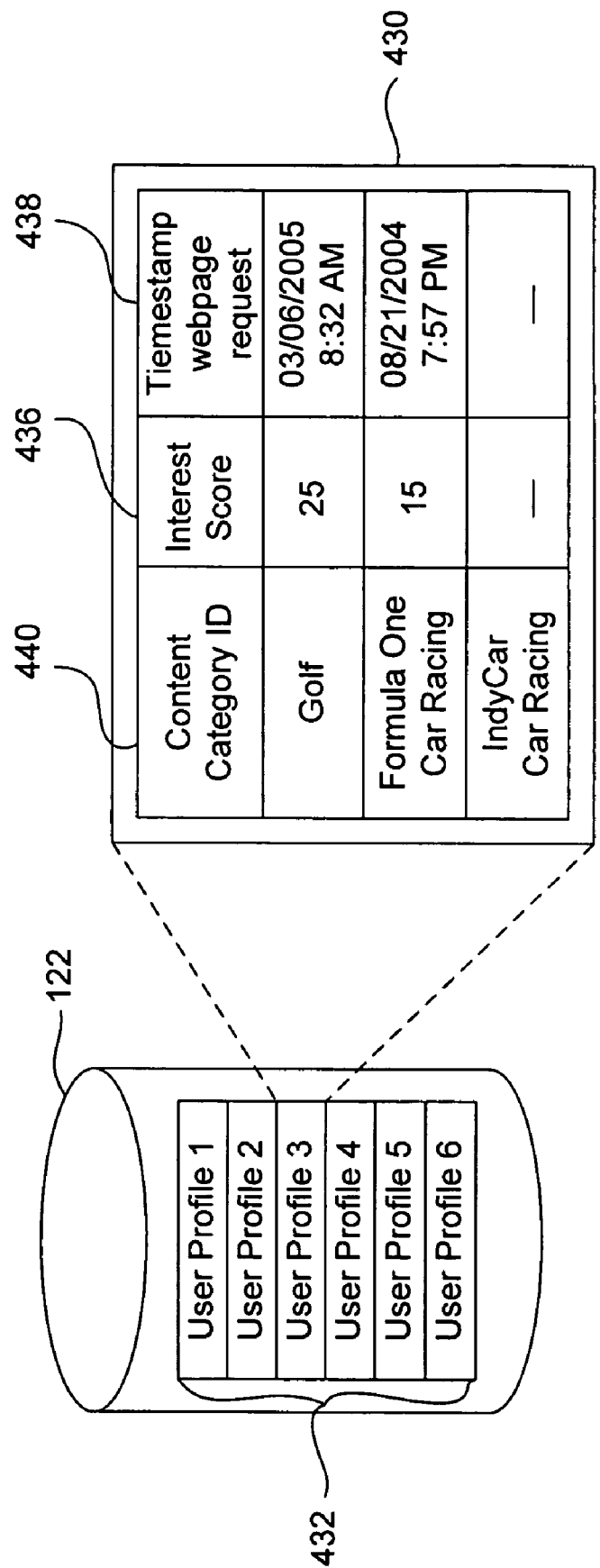
FIG. 4B illustrates the data structure of a user profile.

FIG. 4B illustrates the data structure of a user profile. Each user profile 430 can be implemented utilizing known data structures such as tables, database records, instances of an object-oriented class (an object), etc. In one embodiment, a user profile 430 can be a record of a user profile table 432 located in database 122. In another embodiment, a user profile can be an instance of a class having multiple attributes. Each user profile 430 can be uniquely identified by a user identifier. For example, the user profile table 432 can include a plurality of user identifiers and the data for each corresponding user profile.

In one embodiment, each profile 430 can be a generic map that includes values corresponding to the content category identifier 440, the interest score 436, and the timestamp 438. The content category identifier 440 can be numerical value that is interpreted as a content category. In another embodiment, the content category identifier 440 can be character string corresponding to the name of the content category, for example if the content category is Golf, the category identifier 440 can be a character string "Golf."

In another embodiment, the interest score 436 is a point system represented by a numerical value with a range of 0 to 100 points. In another embodiment, the interest score 436 is a numerical value with a range of 0.00 to 1.00 points. In yet another embodiment, the interest score 436 can have any other numerical value range or be stored as a character string. Furthermore, the timestamp 436 can also be stored as a numerical value as well as a character string.

While utilizing various data types for storing the category content identifier 440, the interest score 436, and the timestamp 438, a numerical data type can be used by any of these. Having the content category identifier 440, the interest score 436, and the timestamp 438 stored in numerical values facilitates quick access to information as well as the ability to store larger numbers of user profiles 430. In addition, user profiles can be stored for longer periods of time without having to purge them in order to save memory space. Furthermore, utilizing numerical values to represent user interest prevents the usage of private information of users. This protects the user's privacy without sacrificing the effectiveness of the behavioral targeting system.

The user profile 430 includes illustrated in FIG. 4B, includes three content categories: Golf, Formula One Car Racing, and IndyCar Car Racing. The interest score 436 for Golf is 25 points, and the last request was made at Mar. 6, 2005 at 8:32 AM. The user profile 430 in FIG. 4B indicates that the user has in interest level of 15 points for the content category Formula One Car Racing and that the last visit to a webpage associated with the Formula One Car Racing content category was on Aug. 21, 2004 at 7:57 PM. Finally, the user category for IndyCar Car Racing shows that the user does not have an interest in this content category. In another embodiment, the user profile can simply not include content category in which the user has no interest. For example, a user profile 430 can simply have one entry for Golf as the content category identifier 440, the interest score 436 as 25 points and the timestamp 438 of the last request. In another example, the user profile can have five content categories, each with a corresponding interest score 436 and a timestamp 438.

Score Calculation

The interest score 436 corresponding to each of the content categories can be calculated according to different contributing factors. The factors that can determine the interest score can include 1) the frequency of visits to any of the webpages associated with the content category; 2) the time elapsed from one visit to the next; and 3) a decay rate.

In one embodiment, the interest score 436 changes based on the frequency of visits to any of the webpages associated with the content category. The more frequent a user visits any of the webpages associated with the content category, the higher the interest score 436. Thus, every time a user visits any of the webpages associated with the content category, the interest score 436 can be increased by a fixed amount. On every visit to a given webpage, the content category associated the webpage is identified. For example, if a user visits the Formula One Car Racing webpage 428 illustrated in FIG. 4A, the system maps the universal resource locator associated with the Formula One Car Racing webpage 428 to the corresponding category Formula One Car Racing 406. Based on the user identifier, the user profile 430 is retrieved and the interest score 436 for Formula One Car Racing is updated. The interest score 436 can be increased by 1, 5, 10 or any other arbitrary setting configured in the system to be the standard increase for a visit to a webpage in the content category. As such, in one embodiment, the amount of increase can be configured to be, for example, 10 points every time the user visits a webpage in the content category. In another embodiment, the amount of increase can be 5 points.

As such, the interest score 436 for a content category can increase based on the total number of visits to the webpages associated with the content. For example, referring to FIG. 4A, visits the webpage 416 about the Golf US Open as well as visits to webpage 418 related to the Golf Players increases the interest score 436 of the content category Golf in the user profile 430. In the user profile 430 illustrated in FIG. 4B, for instance, the fixed increase can be configured to be 10 points. If the user visits both, the webpage 416 for Golf US Open as well as visits to webpage 418 related to the Golf Players, the total increase would be 20 points for the content category Golf, 10 for each webpage visit. The interest score 436 increases from 25 points to 45 points.

In another embodiment, if a webpage is associated with more than one content category, each of the interest scores in the content categories can be increased. For example, in FIG. 4A the car racing news webpage 424 is associated with two content categories, namely content category 408 corresponding to IndyCar Car Racing, and the content category 408 corresponding to Formula One Car Racing. Thus, when a user requests the car racing new website 424, the interest score 436 corresponding to each of the content categories increases. In the user profile illustrated in FIG. 4B, for instance, if the fixed increase is configured to be 10 points, the interest score 436 for Formula One Car Racing increases from 15 points to 25 points. Likewise, the interest score 436 for IndyCar Car Racing will now be 10 points.

In another embodiment, the interest score 436 changes based on the time elapsed from one visit to the next. While the number of visits over a certain period of time is directly proportional to the interest score 436, the time between visits can also provides with insightful information about user behavior. For example, a first user might visit the Formula One Car Racing webpage four times in a period of twelve weeks. The four visits can occurred within a period of four minutes during the first week. A second user might also visit Formula One Car Racing webpage four times in a period of twelve weeks. However, the second user might visit once a week for the last four weeks of the twelve-week period. While the visitation frequency of both users is the same, namely four visits in twelve weeks, the behavior is not the same. To better account for this disparity, the elapsed time between visits can also be taken into account when calculating the interest score 436 for each category. In that way, the user profile 430 corresponding to each user is a closer prediction of user's interest for certain content.

In one embodiment, the elapsed time is calculated by subtracting the current time from the timestamp 438 the last visit. As discussed above, the user profile 430 include the timestamp 438 the last visit to any of the webpages associated with the content category 440. For example, if the content category is Golf, the timestamp 438 can be for the last visit to the webpage 416 related to the Golf US Open. If the user then visits the same webpage 416, two days later, the calculated time elapsed will be two days. In another example, if the timestamp 438 can be for the last visit to the webpage 416 related to the Golf US Open and the user visits another webpage 418 for Golf Players two days later, the elapsed time will also be two days because webpage 418 and webpage 416 correspond to the same content category Golf.

A user that visits a webpage within short intervals of time is assumed to have higher interest in the content of the webpage, and therefore in the content category. As such, the relationship between the interest score and the amount of time elapsed is inversely proportional. The shorter the time elapsed from one visit to the next, the higher the interest score. In one embodiment, the elapsed time can be expressed in terms of a multiplier fraction that has the amount of time in the denominator and one in the numerator. The elapsed time can be expressed in number of minutes, hours, etc.

In yet another embodiment, the interest score 436 changes based on a decay rate. A previously mentioned, the interest score 436 is decayed based on a configured decay rate. Users that visit websites of a certain content might not come back to visit for a long time, if ever. The current system therefore applies a decay rate for every user interest score 436. Thus, if the user continues to visit the website the interest score 436 is maintained, but if the user ceases to visit websites of the given content category, the user interest score 436 decreases to the point that the system no longer recognizes the user as being interested in the content category. This decay mimics the human memory function of forgetting where repeated access to a memory maintains that memory, but non-access to the memory eliminates the memory over time. The decay rate applied to the interest score functions as a "forgetting" mechanism. If a user does not revisit a webpage for a content category, the user interest in the category decreases over time, which is reflected in the decreasing interest score 436.

In one embodiment, the decay rate is applied uniformly to all interest scores 436 of all the user profiles. As such, the system can decay interest scores on a regular basis. In one embodiment, all interest scores of all user profiles are decayed by a percentage (e.g. 7.5%) everyday. In one embodiment, all interest scores of all user profiles are decayed by a percentage (e.g. 15%) every week. In yet another embodiment, the decay is a constant fixed number. For example, if interest score range is 1 to 100 points, the decay rate can be 1 point per day. In yet another embodiment, each interest score is decayed every time the user visits certain category, wherein the decay takes into consideration the amount of time elapsed such that the higher the time elapsed, the higher the decay rate applied.

In another embodiment, a long-term and short-term decay rates can be used. When a user visits webpages associated with a particular content category a high number of times, the user can be assumed to have a long-term interest in that content category. For example, some content categories can have seasonal information that by definition greatly attracts users for short period of time until the next season arrives. If the user makes many visits to webpages related to a specific content category, the user can be deemed to have a long-term interest in that content category. In order to preserve the user profile in the system, the decay rate applied can be a long-term decay rate that decays the interest score for the seasonal content category much slower.

FIG. 4C illustrates a user profile and associated short-term decay rates. In one embodiment, each user profile in the system can be divided into two portions: a first portion containing content categories and corresponding interest scores that decay with a short-term decay rate, and a second portion containing content categories and corresponding interest scores that decay with a long-term decay rate. Depending upon the data structure utilized, the user profile 430 can be configured to differentiate between the content categories in which the user has a long-term interest and a short-term interest.

For example each of the content category in a the user profile 430 can have a corresponding attribute or flag (implemented with any data type) that can indicate whether the decay applied to the interest score that particular content category is to be decayed with the short-term decay rate or the long term decay rate. In another example, each user profile 430 can include two tables, one for the content categories with long-term interest, and another for the content categories with short-term interest.

In one embodiment, when a user first accesses a particular content, that is any webpage associated with a particular content, the user is assumed to have short-term interest. As shown in FIG. 4C, the user profile 430 can have all of the content categories having a short term applied. Namely, the decay rate attributes 442, 444, and 446 are all "Short Term," showing that the user has a short-term interest in Golf, Formula One Car Racing and IndyCar Car Racing. As discussed above, the decay can be calculated periodically for all of the interest scores in the system. The three interest scores in user profile 430 as shown in FIG. 4C can decrease gradually but quickly as the short-term decay applies.

The interest score 436 for each category can increase, decrease or remain approximately the same. In order to remain the same, the user must frequently visit webpages associated with the content category. As the decay is applied to the interest score of the category, the decrease due to the decay can be compensated by the increase due to visits to webpages corresponding to the content category.

In another embodiment, a low threshold can be established such that when the interest score decreases due to decay applied, interest score that reaches the low threshold indicates to the system that the user is no longer interested in the content category corresponding to the low interest score. The content category can then be removed from the content categories in the user profile. If the content category was the only one left in the listing of content categories, the user profile can be removed from the user profile database.

In yet another embodiment, a high threshold can be established such that when the interest score increases due very frequent visitation to webpages associated with the content category. When the interest score reaches the high threshold, the system can recognize the user as a "power user" and change the decay rate applied to the content category to be a long-term decay.

FIG. 4D illustrates a user profile and associated short-term and long-term decay rates. When a user visits webpages related to the content category with a frequency that causes the interest score to increase and reach the high threshold level, the user can be considered to have a long-term interest in that content category. For example, a threshold level for a category "Golf" can be established to be 40 points. Any user that reaches 40 points or beyond qualifies as a "power user" on the category of Golf, and therefore the decay rate applied can be a long-term decay rate. If the user has an interest score of 25 points for the Golf content category, the user can visit a Golf-related webpage twice in one day and accumulate 20 extra points (assuming 10 points are awarded per visit). Taking into consideration that a daily short-term decay rate of 7.5% was applied earlier, and without taking into consideration the elapsed time between visits, the total interest score for the user can be (25−1.875)+20=43.125. Thus, the interest score for the Golf category for that user has surpassed the threshold level. Once the interest score reaches the high threshold, the decay rate applied 442 changes from short-term to long-term. Subsequently, all further application of decay to the interest level of the section golf can be long-term. The decay rate attributes 444 and 446 remain as "Short Term," reflecting that the user has a short-term interest in Formula One Car Racing and IndyCar Car Racing. The decay rate attribute 442 is now "Long Term" reflecting that the user has a long-term interest in Golf.

In another example, the high threshold level can be 50 points. If the user visits webpages associated with the Golf content category four times in day one, the interest score can increase to 40 points. Then in day two, if the user does not revisit a webpage associated with the Golf content category the user score can decay to 37 points. In day three, however, if the user visits two webpages associated with the Golf content category the interest score for the Golf content category can be (37−2.775)+20=54.225 thus surpassing the threshold level of 50 points.

As discussed above, the decay can be calculated periodically for all of the interest scores in the system. The system applies the long-term decay rate to the interest scores that are flagged to have a long-term decay, and a short-term decay rate to the interest score that are flagged to have a short-term decay. For example, if the short-term decay rate is 20% and the long-term decay rate is 7.5%, all interest scores in all user profiles that are associated with content categories that have a long-term decay rate applied will be decayed by 7.5%. Likewise, all interest scores in all user profiles that are associated with content categories that have a short-term decay rate applied are decayed by 20%.

In one embodiment, the high threshold level can be the same for all content categories (e.g. 50 points). In another embodiment, the high threshold level can be different for each content category (e.g. 50 points for Golf, and 40 points for Formula One Car Racing).

Figure 5A:
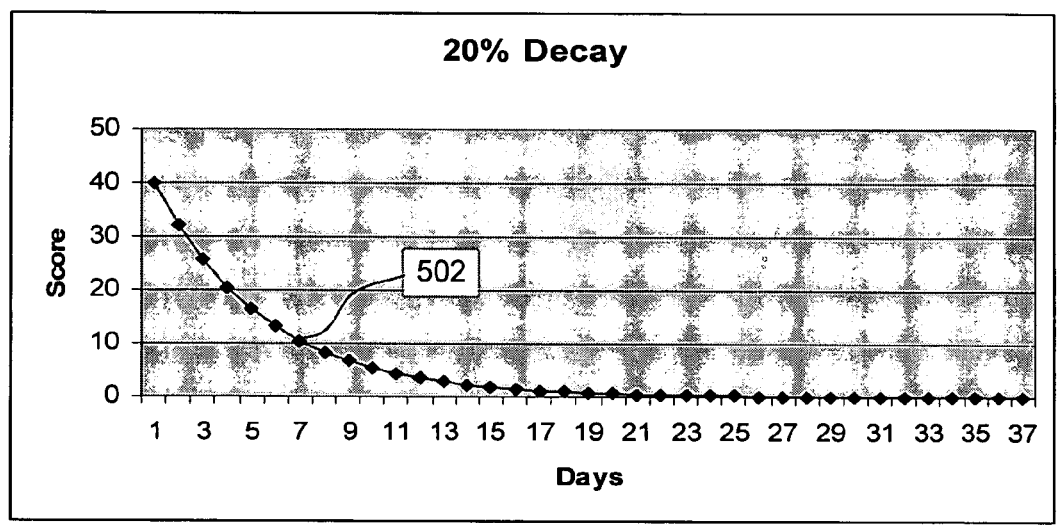
FIG. 5A illustrates a decay curve wherein the decay rate is a short-term decay rate.

FIG. 5A illustrates a decay curve wherein the decay rate is a short-term decay rate. The curve shows the decay of the interest score for a content category in which the decay rate applied is a 20% decay. The initial interest score is 40 points. Without further interaction by the user, such as user visits to webpages related to the content category, the interest score decreases rapidly. For example, point 402 shows that on the seventh day the interest score has decreased down to 10 points.

Figure 5B:
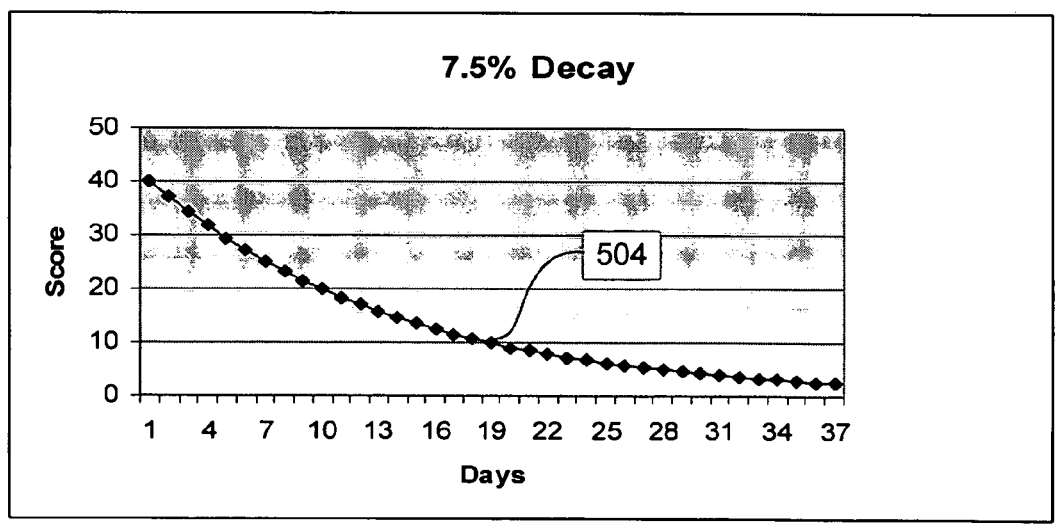
FIG. 5B illustrates a decay curve wherein the decay rate is a long-term decay rate.

FIG. 5B illustrates a decay curve wherein the decay rate is a long-term decay rate. The curve shows the decay of the interest score for a content category in which the decay rate applied is a 7.5% decay rate. The initial interest score is 40 points. Without further interaction by the user, such as user visits to webpages related to the content category, the interest score decreases but not as rapidly as with a decay rate of 20% as show in FIG. 5A above. For example, point 404 of FIG. 5B shows that not until the nineteenth day does the interest score decrease down to 10 points.

Although certain illustrative embodiments and methods have been disclosed herein, it will be apparent form the foregoing disclosure to those skilled in the art that variations and modifications of such embodiments and methods may be made without departing from the true spirit and scope of the art disclosed. For example, a user can show interest in a content category not only by viewing associated webpages, by also by accessing web content related to the content category. For example images, video, audio, text, ads, flash animations, and any other web content that is related to the substance of the particular content category.

Many other examples of the art disclosed exist, each differing from others in matters of detail only. Accordingly, it is intended that the art disclosed shall be limited only to the extent required by the appended claims and the rules and principles of applicable law.

What is claimed is:

1. A computer implemented method of generating a user profile for targeted advertisement over a computer network, the method comprising:
   determining a webpage identifier that identifies a webpage;
   defining a content category identifier that identifies a content category;
   associating the webpage identifier with the content category identifier when web content depicted in the webpage is relevant to the content category;
   receiving, at a web server, a request for the webpage, the request including the webpage identifier and a first user identifier, the request being received from a client computer connected to the computer network;
   locating the user profile by determining whether the first user identifier matches a second user identifier corresponding to the user profile, wherein the user profile includes a user interest score corresponding to a user content category identifier;
   increasing the corresponding user interest score by an arbitrary standard amount when the content category identifier associated with the requested webpage matches the user content category identifier, wherein the arbitrary standard amount is established independently from the web content depicted in the webpage being viewed by a user;
   increasing the corresponding user interest score by an amount representative of an elapsed time between the time of a previous webpage request having a similar content category identifier to the request for the webpage;
   selecting an advertisement based on the user interest score;
   providing the advertisement to the user over the computer network for display on a display device of the client computer; and
   utilizing a plurality of decay rates to decay the corresponding user interest score, wherein a decay rate from the plurality of decay rates is chosen to be utilized depending upon user behavior;
   wherein:
   when the corresponding user interest score decreases below a threshold, the corresponding user interest score is reduced according to a second decay rate which reduces the corresponding user interest score at a greater rate than a first decay rate; and
   when the corresponding user interest score surpasses another threshold, the corresponding user interest score ceases to be reduced by the second decay rate and is instead reduced by the first decay rate.

2. The method of claim 1, wherein the webpage identifier is a universal resource locator.

3. The method of claim 1, wherein the corresponding user interest score is indicative of a level of interest of the user in a content category.

4. The method of claim 1, wherein the corresponding user interest score is reduced daily regardless of whether a webpage request has been received at the web server.

5. The method of claim 1, wherein the corresponding user interest score is reduced periodically regardless of whether a webpage request has been received at the web server.

6. The method of claim 1, further comprising decaying the corresponding user interest score of a first content category in the user profile at a different rate from the corresponding user interest score of a second content category, wherein difference is due to the user behaving differently with respect to the first content category in comparison to the user's behavior with respect to the second content category.

7. The method of claim 6, wherein the corresponding user interest score of the second content category in the user profile is decayed at the second decay rate if the user shows a second interest in the second content category.

8. The method of claim 6, wherein the corresponding user interest score of the first content category in the user profile is decayed at the first decay rate if the user shows a first interest in the first content category.

9. The method of claim 8, wherein the user shows the first interest if the user makes webpage requests frequent enough such that the corresponding user interest score increases beyond a predefined threshold.

10. The method of claim 1, further comprising:
    assigning the corresponding user interest score to be reduced by the first decay rate if the corresponding user interest score of the content category identifier surpasses a first threshold;
    determining whether the user has a first interest in the content category by checking whether the content category is assigned to be reduced by the first decay rate; and
    if the user has the first interest in the content category, decaying the corresponding user interest score utilizing the first decay rate, wherein the first decay rate reduces the corresponding user interest score.

11. The method of claim 10, wherein if the user does not have the first interest in the content category, decaying the corresponding user interest score utilizing the second decay rate.

12. The method of claim 1, further comprising deleting the user profile if a webpage request is not received from a user after a threshold time.

13. The method of claim 1, further comprising deleting the user profile if the corresponding user interest score decreases below a threshold.

14. The method of claim 1, further comprising deleting a user interest score corresponding to a particular content category from the user profile if the user interest score corresponding to that particular content category decreases below a threshold.

15. The method of claim 1, wherein the webpage request includes a webpage request timestamp.

16. The method of claim 1, wherein the arbitrary standard amount is utilized to increase the corresponding user interest score every time the user makes a request to a website that has an associated content category.

17. The method of claim 1, wherein the arbitrary standard amount is utilized to increase the user interest score corresponding to each one of a plurality of content category identifiers in a user profile.

18. The method of claim 1, further comprising logging the webpage identifier, and the user identifier, in a log file.

19. The method of claim 1, further associating the webpage and at least one other content category by correlating the webpage identifier corresponding to the webpage with a content category identifier corresponding to the at least one other content category.

20. The method of claim 1, wherein the webpage identifier is further associated with a second content category, such that when the webpage is requested, a second user interest score corresponding to second content category is increased by predetermined amount.

21. The method of claim 1, wherein the user profile is implemented utilizing a data structure comprising a content category field, an interest score field, and a timestamp field.

22. A computer implemented method of generating a user profile associated with a user for advertisement over a computer network, comprising:
  determining a webpage identifier that identifies a webpage;
  defining a content category identifier that identifies a content category;
  associating the webpage identifier with the content category identifier when web content depicted in the webpage is relevant to the content category;
  receiving, at a web server, a request for the webpage, the request including the webpage identifier and a first user identifier, the request being received from a client computer connected to the computer network;
  locating the user profile by determining whether the first user identifier matches a second user identifier corresponding to the user profile, wherein the user profile includes at least one user content category identifier and a corresponding user interest score;
  if the content category identifier matches the at least one user content category identifier, increasing the corresponding user interest score by an arbitrary standard amount, wherein the arbitrary standard amount is established independently from the web content depicted in the webpage being viewed by the user;
  increasing the corresponding user interest score by an amount representative of an elapsed time between the time of a previous webpage request having a similar content category identifier to the request for the webpage;
  assigning the corresponding user interest score to be reduced by a first decay rate when the corresponding user interest score of the content category identifier surpasses a first threshold;
  determining whether the user has a first interest in the content category by checking whether the content category is assigned to be reduced by the first decay rate;
  if the user has the first interest in the content category, decaying the corresponding user interest score utilizing the first decay rate, wherein the first decay rate reduces the corresponding user interest score at a slower rate than a second decay rate;
  selecting the advertisement based on the user interest score; and
  providing the advertisement to the user over the computer network for display on a display device of the client computer;
  wherein if the user does not have the first interest in the content category, decaying the corresponding user interest score utilizing the second decay rate;
  wherein:
  when the corresponding user interest score decreases below a second threshold, the corresponding user interest score is reduced according to the second decay rate which reduces the corresponding user interest score at a greater rate than the first decay rate; and
  when the corresponding user interest score surpasses the first threshold, the corresponding user interest score ceases to be reduced by the second decay rate and instead reduced by the first decay rate.

23. A system to deliver advertisement over a computer network, the system comprising:
  a merchant sever configured to receive a webpage request from a web browser, the webpage request including a universal resource locator and a user identifier, wherein the merchant server has a memory and a user profile database to store user profiles, each user profile comprising a plurality of user content category identifiers, wherein each content category identifier of the plurality of content category identifiers has a corresponding user interest score and a timestamp indicating when the webpage request is last received, wherein the corresponding user interest score increases by an arbitrary setting configured in the system to be a standard increase based on frequency a webpage associated with content category is requested, the user interest score additionally increases by an amount representative of an elapsed time between the time of a previous webpage request having a similar content category identifier to the webpage request;
  wherein the corresponding user interest score is reduced according to a decay rate; and
  wherein:
  when the corresponding user interest score decreases below a threshold, the corresponding user interest score is reduced according to a second decay rate which reduces the corresponding user interest score at a greater rate than a first decay rate; and
  when the corresponding user interest score surpasses another threshold, the corresponding user interest score ceases to be reduced by the second decay rate and the corresponding user interest score is instead reduced by the first decay rate.

24. The system of claim 23, wherein the corresponding user interest score is indicative of a level of interest of the user in a content category identified by a corresponding one of the user content category identifiers.

25. The system of claim 23, wherein the corresponding user interest score is reduced daily regardless of whether a webpage request has been received at the web server.

26. A computer implemented method of providing a targeted advertisement over a computer network to a user, the method comprising:

receiving from a user's client computer a request for a webpage, the request including a webpage identifier and a first user identifier, the request being received by a web server that locates a user profile by determining whether the first user identifier matches a second user identifier corresponding to the user profile, wherein the web server further locates a content category identifier in the user profile by determining whether web content depicted in the webpage is associated to content identified by the content category identifier, wherein the web server increases a corresponding user interest score corresponding to the content category identifier by an arbitrary standard amount that is independent from the web content depicted in the webpage and wherein the web server additionally increases the corresponding user interest score by an amount representative of an elapsed time between the time of a previous webpage request having a similar content category identifier to the request for the webpage;

receiving the requested webpage from the web server;

receiving Internet content, wherein the Internet content is related to a content category in the user profile having an associated interest score higher than the arbitrary standard amount;

selecting an advertisement based on the user interest score; and providing the advertisement to the client computer over the computer network for display on a display device of the client computer; and wherein:

when the corresponding user interest score decreases below a threshold, the corresponding user interest score is reduced according to a second decay rate which reduces the corresponding user interest score at a greater rate than a first decay rate; and when the corresponding user interest score surpasses another threshold, the corresponding user interest score ceases to be reduced by the second decay rate and is instead reduced by the first decay rate.

27. The method of claim 26, wherein the Internet content includes advertisement.

28. The method of claim 26, wherein the Internet content includes music.

29. The method of claim 26, wherein the Internet content includes video.

30. The method of claim 26, wherein the webpage identifier is a universal resource locator.

31. The method of claim 26, wherein the corresponding user interest score is indicative of a level of interest of the user in a content category identified by the user content category identifier.

* * * * *